(12) United States Patent
Shakal et al.

(10) Patent No.: US 12,392,332 B2
(45) Date of Patent: Aug. 19, 2025

(54) PUMP HOUSING WITH VERTICALLY SUPPORTED VIBRATION ISOLATORS

(71) Applicant: Sleep Number Corporation, Minneapolis, MN (US)

(72) Inventors: Anthony John Shakal, Rogers, MN (US); Casey Carlson, Independence, MN (US); Ryan Douglas, Stillwater, MN (US)

(73) Assignee: Sleep Number Corporation, Minneapolis, MN (US)

( * ) Notice: Subject to any disclaimer, the term of this patent is extended or adjusted under 35 U.S.C. 154(b) by 5 days.

(21) Appl. No.: 18/222,104

(22) Filed: Jul. 14, 2023

(65) Prior Publication Data

US 2024/0011476 A1    Jan. 11, 2024

Related U.S. Application Data

(63) Continuation of application No. 16/895,344, filed on Jun. 8, 2020, now abandoned, which is a continuation of application No. 15/337,470, filed on Oct. 28, 2016, now Pat. No. 10,677,232.

(51) Int. Cl.
| | |
|---|---|
| *F04B 39/00* | (2006.01) |
| *F04B 39/12* | (2006.01) |
| *F04B 53/00* | (2006.01) |
| *F04B 53/16* | (2006.01) |
| *F16F 1/46* | (2006.01) |

(52) U.S. Cl.
CPC ........ *F04B 39/0044* (2013.01); *F04B 39/127* (2013.01); *F04B 53/001* (2013.01); *F04B 53/003* (2013.01); *F16F 1/46* (2013.01); *F04B 53/16* (2013.01)

(58) Field of Classification Search
CPC .. F04B 39/0044; F04B 39/0027; F04B 53/16; F04B 53/001; F16F 1/46; F16F 1/36; F16F 1/373; F16F 1/3737; F16F 1/377; F16F 1/42

See application file for complete search history.

(56) References Cited

U.S. PATENT DOCUMENTS

| | | | |
|---|---|---|---|
| 1,377,556 A | 5/1921 | Bridgman |
| 2,483,295 A | 9/1949 | Edmund |
| 2,809,005 A | 10/1957 | Goode |
| 3,727,865 A | 4/1973 | Melrose et al. |

(Continued)

FOREIGN PATENT DOCUMENTS

| | | |
|---|---|---|
| CN | 105909499 | 8/2016 |
| CN | 105909499 A * | 8/2016 |

(Continued)

OTHER PUBLICATIONS

U.S. Appl. No. 09/471,592, filed Dec. 23, 1999, Shafer.

(Continued)

*Primary Examiner* — Philip E Stimpert
(74) *Attorney, Agent, or Firm* — Fish & Richardson P.C.

(57) ABSTRACT

An apparatus can include a housing defining a housing interior, an air pump positioned in the housing interior, and a plurality of resilient connectors connecting the air pump to the housing with the resilient connectors in tension so as to reduce transmission of vibration from the air pump to the housing during operation of the air pump.

22 Claims, 8 Drawing Sheets

(56) References Cited

U.S. PATENT DOCUMENTS

| | | |
|---|---|---|
| 4,644,597 A | 2/1987 | Walker |
| 4,766,628 A | 8/1988 | Greer et al. |
| 4,788,729 A | 12/1988 | Greer et al. |
| D300,194 S | 3/1989 | Walker |
| 4,829,616 A | 5/1989 | Walker |
| 4,864,683 A | 9/1989 | Herron et al. |
| 4,890,344 A | 1/1990 | Walker |
| 4,897,890 A | 2/1990 | Walker |
| 4,901,681 A | 2/1990 | Pozniak |
| 4,908,895 A | 3/1990 | Walker |
| D313,973 S | 1/1991 | Walker |
| 4,984,971 A | 1/1991 | Bergeron |
| 4,991,244 A | 2/1991 | Walker |
| 5,144,706 A | 9/1992 | Walker et al. |
| 5,170,522 A | 12/1992 | Walker |
| D368,475 S | 4/1996 | Scott |
| 5,509,154 A | 4/1996 | Shafer et al. |
| 5,564,140 A | 10/1996 | Shoenhair et al. |
| 5,634,225 A | 6/1997 | Miller et al. |
| 5,642,546 A | 7/1997 | Shoenhair |
| 5,652,484 A | 7/1997 | Shafer et al. |
| 5,765,246 A | 6/1998 | Shoenhair |
| 5,903,941 A | 5/1999 | Shafer et al. |
| 5,904,172 A | 5/1999 | Gifft et al. |
| 5,964,579 A | 10/1999 | Tang et al. |
| 6,037,723 A | 3/2000 | Shafer et al. |
| 6,108,844 A | 8/2000 | Kraft et al. |
| 6,161,231 A | 12/2000 | Kraft et al. |
| 6,202,239 B1 | 3/2001 | Ward et al. |
| 6,397,419 B1 | 6/2002 | Mechache |
| 6,483,264 B1 | 11/2002 | Shafer et al. |
| 6,686,711 B2 | 2/2004 | Rose et al. |
| 6,708,357 B2 | 3/2004 | Gaboury et al. |
| 6,763,541 B2 | 7/2004 | Mahoney et al. |
| 6,804,848 B1 | 10/2004 | Rose |
| 6,832,397 B2 | 12/2004 | Gaboury |
| D502,929 S | 3/2005 | Copeland et al. |
| 6,883,191 B2 | 4/2005 | Gaboury et al. |
| 7,322,801 B2 | 1/2008 | Li et al. |
| 7,389,554 B1 | 6/2008 | Rose |
| 7,865,988 B2 | 1/2011 | Koughan et al. |
| 8,282,452 B2 | 10/2012 | Grigsby et al. |
| 8,336,369 B2 | 12/2012 | Mahoney |
| 8,444,558 B2 | 5/2013 | Young et al. |
| D691,118 S | 10/2013 | Ingham et al. |
| D697,874 S | 1/2014 | Stusynski et al. |
| D698,338 S | 1/2014 | Ingham |
| D701,536 S | 3/2014 | Sakal |
| 8,672,853 B2 | 3/2014 | Young |
| 8,769,747 B2 | 7/2014 | Mahoney et al. |
| 8,783,781 B1 | 7/2014 | McClure et al. |
| 8,876,092 B2 * | 11/2014 | Wojcieson .............. F16F 15/08 267/141 |
| 8,893,339 B2 | 11/2014 | Fleury et al. |
| 8,931,329 B2 | 1/2015 | Mahoney et al. |
| 8,966,689 B2 | 3/2015 | McGuire et al. |
| 8,973,183 B1 | 3/2015 | Palashewski et al. |
| 8,984,687 B2 | 3/2015 | Stusynski et al. |
| D728,254 S | 5/2015 | Blazar et al. |
| D737,250 S | 8/2015 | Ingham et al. |
| 9,314,118 B2 | 4/2016 | Blazar et al. |
| 9,578,941 B2 | 2/2017 | MacLachlan et al. |
| 9,730,524 B2 | 8/2017 | Chen et al. |
| 9,737,154 B2 | 8/2017 | Mahoney et al. |
| D809,843 S | 2/2018 | Keeley et al. |
| D812,393 S | 3/2018 | Karschnik et al. |
| 9,924,813 B1 | 3/2018 | Basten et al. |
| 10,143,312 B2 | 12/2018 | Brosnan et al. |
| 10,149,549 B2 | 12/2018 | Erko et al. |
| D840,732 S | 2/2019 | Peterson et al. |
| 10,194,753 B2 | 2/2019 | Fleury et al. |
| 10,285,508 B2 | 5/2019 | Rose et al. |
| 10,342,358 B1 | 7/2019 | Palashewski et al. |
| D857,433 S | 8/2019 | Kiekhoefer et al. |
| 10,531,745 B2 | 1/2020 | McGuire et al. |
| 10,539,170 B2 | 1/2020 | Peterson et al. |
| 10,575,654 B2 | 3/2020 | Shakal |
| 10,729,253 B1 | 8/2020 | Gaunt |
| 10,765,224 B2 | 9/2020 | Chen et al. |
| 10,813,470 B2 | 10/2020 | Mahoney et al. |
| 10,888,173 B2 | 1/2021 | Shakal et al. |
| 10,993,546 B2 | 5/2021 | Shakal et al. |
| 11,001,447 B2 | 5/2021 | Shutes et al. |
| 11,085,479 B2 | 8/2021 | Griffith et al. |
| 11,096,502 B2 | 8/2021 | Rose et al. |
| D932,808 S | 10/2021 | Keeley |
| 11,140,999 B2 | 10/2021 | Peterson et al. |
| 11,229,297 B2 | 1/2022 | Gaunt |
| 11,484,128 B2 | 11/2022 | Stusynski et al. |
| D982,360 S | 4/2023 | Negus |
| 2002/0053632 A1* | 5/2002 | Becker .................. F16F 15/04 248/610 |
| 2002/0069462 A1 | 6/2002 | Gaboury et al. |
| 2005/0204475 A1 | 9/2005 | Schmitz et al. |
| 2005/0235417 A1 | 10/2005 | Koughan et al. |
| 2006/0254869 A1 | 11/2006 | Wang |
| 2008/0052830 A1 | 3/2008 | Koughan et al. |
| 2008/0077020 A1 | 3/2008 | Young et al. |
| 2010/0043148 A1 | 2/2010 | Rose et al. |
| 2011/0144455 A1 | 6/2011 | Young et al. |
| 2012/0022445 A1 | 1/2012 | Jones |
| 2012/0153536 A1 | 6/2012 | Coffield et al. |
| 2014/0182061 A1 | 7/2014 | Zaiss |
| 2014/0250597 A1 | 9/2014 | Chen et al. |
| 2014/0257571 A1 | 9/2014 | Chen et al. |
| 2014/0259417 A1 | 9/2014 | Nunn et al. |
| 2014/0259418 A1 | 9/2014 | Nunn et al. |
| 2014/0259431 A1 | 9/2014 | Fleury |
| 2014/0259433 A1 | 9/2014 | Nunn et al. |
| 2014/0259434 A1 | 9/2014 | Nunn et al. |
| 2014/0277611 A1 | 9/2014 | Nunn et al. |
| 2014/0277778 A1 | 9/2014 | Nunn et al. |
| 2014/0277822 A1 | 9/2014 | Nunn et al. |
| 2015/0007393 A1 | 1/2015 | Palashewski |
| 2015/0025327 A1 | 1/2015 | Young et al. |
| 2015/0026896 A1 | 1/2015 | Fleury et al. |
| 2015/0157137 A1 | 6/2015 | Nunn et al. |
| 2015/0157519 A1 | 6/2015 | Stusynski et al. |
| 2015/0182033 A1 | 7/2015 | Brosnan et al. |
| 2015/0182397 A1 | 7/2015 | Palashewski et al. |
| 2015/0182399 A1 | 7/2015 | Palashewski et al. |
| 2015/0182418 A1 | 7/2015 | Zaiss |
| 2015/0290059 A1 | 10/2015 | Brosnan et al. |
| 2015/0300345 A1 | 10/2015 | Ansley |
| 2015/0366366 A1 | 12/2015 | Zaiss et al. |
| 2015/0374137 A1 | 12/2015 | Mahoney et al. |
| 2016/0100696 A1 | 4/2016 | Palashewski et al. |
| 2018/0119686 A1* | 5/2018 | Shakal ................ F04B 39/0044 |
| 2018/0125259 A1 | 5/2018 | Peterson et al. |
| 2019/0082855 A1 | 3/2019 | Brosnan et al. |
| 2020/0187667 A1 | 6/2020 | Shakal |
| 2020/0359805 A1 | 11/2020 | Brosnan et al. |
| 2020/0375369 A1 | 12/2020 | Negus et al. |
| 2021/0145183 A1 | 5/2021 | Negus et al. |
| 2021/0145185 A1 | 5/2021 | Negus et al. |
| 2021/0177155 A1 | 6/2021 | McGuire et al. |
| 2021/0244196 A1 | 8/2021 | Hilden et al. |
| 2021/0251392 A1 | 8/2021 | Shakal |
| 2021/0330090 A1 | 10/2021 | Shakal et al. |
| 2021/0341006 A1 | 11/2021 | Griffith et al. |
| 2022/0192388 A1 | 6/2022 | Smith et al. |
| 2022/0218116 A1 | 7/2022 | Rose et al. |
| 2022/0273118 A1 | 9/2022 | Peterson et al. |
| 2022/0322840 A1 | 10/2022 | Gaunt |
| 2022/0369827 A1 | 11/2022 | Rose et al. |
| 2023/0017015 A1 | 1/2023 | Karschnik et al. |
| 2023/0027288 A1 | 1/2023 | Karschnik |
| 2023/0031563 A1 | 2/2023 | Molina et al. |
| 2023/0057322 A1 | 2/2023 | Shakal |
| 2023/0063979 A1 | 3/2023 | Doffing et al. |
| 2023/0128215 A1 | 4/2023 | Karschnik et al. |
| 2023/0148764 A1 | 5/2023 | Negus et al. |

(56) References Cited

U.S. PATENT DOCUMENTS

2023/0218088 A1  7/2023 Brosnan et al.
2023/0389717 A1  12/2023 Yang et al.

FOREIGN PATENT DOCUMENTS

| EP | 1956263 | 8/2008 |
| EP | 3086122 | 10/2016 |
| EP | 3086122 A1 * | 10/2016 |

OTHER PUBLICATIONS

U.S. Appl. No. 14/594,843, filed Jan. 12, 2015, Rose et al.
U.S. Appl. No. 18/196,658, filed May 12, 2023, Herman et al.
U.S. Appl. No. 18/221,628, filed Jul. 13, 2023, Karschnik et al.
U.S. Appl. No. 18/222,104, filed Jul. 14, 2023, Shakal et al.
U.S. Appl. No. 18/367,634, filed Sep. 13, 2023, Gaunt.
U.S. Appl. No. 18/377,932, filed Oct. 9, 2023, VerBockel et al.
U.S. Appl. No. 18/382,902, filed Oct. 23, 2023, Doffing et al.
U.S. Appl. No. 18/512,568, filed Nov. 17, 2023, Stusynski et al.
U.S. Appl. No. 29/719,090, filed Dec. 31, 2019, Negus et al.
U.S. Appl. No. 29/821,785, filed Jan. 3, 2022, Negus et al.

* cited by examiner

PUMP HOUSING WITH VERTICALLY SUPPORTED VIBRATION ISOLATORS

CROSS-REFERENCE TO RELATED APPLICATIONS

This application is a continuation of U.S. Utility application Ser. No. 16/518,344, filed Jun. 8, 2020, which is a continuation of U.S. Application Serial No. U.S. application Ser. No. 15/337,470 (now U.S. Pat. No. 10,677,232), filed Oct. 28, 2016. The disclosures of the prior applications are considered part of (and are incorporated by reference in) the disclosure of this application.

TECHNICAL FIELD

This invention relates to pumps, and more particularly to vibration of pumps for use in beds.

BACKGROUND

People have traditionally used beds that come in many shapes, sizes, and styles. Such beds can range from extremely simple designs to rather complex designs that include a variety of features. For example, some beds can have one or more inflatable air chambers. Some of such beds can include an inflation system including a number of mechanical and electrical components. For example, some beds can include one or more pumps for inflating the air chambers.

SUMMARY

Some embodiments of a pump system can include one or more of the features and functions disclosed herein. Some embodiments can include the pump within a larger housing and can include vibration isolators connecting the pump to the housing. This can allow the pump to vibrate during operation while reducing noise resulting from that operation. The vibration isolators can be elongated, resilient connectors extending from the housing to the pump in tension. The resilient connectors can suspend the pump within the housing so that the pump has little or no contact with the housing during operation. The pump can be an air pump for inflating air chambers of an air mattress, which can benefit from reduced noise from vibration if the pump is to be operated while a user sleeps. The housing can contain a printed circuit board and one or more stops that limit movement of the pump so as to limit or prevent the pump from hitting and damaging the printed circuit board if the pump moves too far in that direction. Various embodiments can be configured with components having particular shapes and features.

In one aspect, an apparatus includes a housing defining a housing interior, an air pump positioned in the housing interior, and a plurality of resilient connectors connecting the air pump to the housing with the resilient connectors in tension so as to reduce transmission of vibration from the air pump to the housing during operation of the air pump.

Some of the implementations described herein may optionally include one or more of the following features. The resilient connectors comprise elastomer bands each having a first end connected to the housing and a second end connected to the air pump. The housing comprises a plurality of housing mounting structures, the air pump comprises a plurality of pump mounting structures, and the resilient connectors each extends from one of the pump mounting structures to the housing mounting structures. The housing mounting structures each comprise a vertical standoff that defines a shoulder and wherein each of the resilient connectors has a first end configured for connecting to the vertical standoff adjacent the shoulder such that the air pump is suspended from the vertical standoff via the resilient connectors. The pump mounting structures each comprise a hole. Each of the resilient connectors has a second end configured for extending into the hole and pulling against the pump mounting structure. The second end of the resilient connector has a cross section with a first wide portion adjacent a narrow neck. The narrow neck is adjacent a second wide portion. The second wide portion tapers to a second narrow portion at a tip of the second end of the resilient connector. The resilient connectors comprise first, second, third, and fourth resilient connectors with the first and third resilient connectors connected so as to pull in tension in substantially opposite directions and the second and fourth resilient connectors are connected so as to pull in tension in substantially opposite directions. The apparatus further includes a printed circuit board comprising a plurality of electronic components positioned in the housing and a stop positioned between the air pump and the printed circuit board and spaced from the air pump. The stop is spaced and the resilient connectors are configured such that the resilient connectors dampen vibration of the motor enough to prevent contact between the motor and the stop during normal operation. The stop is sized to limit movement by the air pump when motion of the air pump toward the printed circuit board exceeds a threshold. The printed circuit board is positioned below the air pump and the stop extends through a hole in the printed circuit board toward the air pump. The apparatus further includes a printed circuit board comprising a plurality of electronic components positioned in the housing and a stop extending from the air pump toward the printed circuit board and that is sized to contact a structure when motion of the air pump toward the printed circuit board exceeds a threshold. The resilient connectors extend laterally outward from the air pump in a substantially horizontal direction. The apparatus further includes a pump manifold fluidically connected to the pump. The pump manifold is mounted to the housing and is spaced from the pump such that pump vibration is substantially isolated from the pump manifold. The apparatus further includes a pump manifold fluidically connected to the pump, an air mattress comprising at least one air chamber fluidically connected to the pump manifold, and a pump controller positioned in the housing and configured to control operation of the air pump to selectively inflate the air chamber of the air mattress. The resilient connectors extend between 0.5 and 1.5 inches between mounting structures of the housing and the air pump. Each of the resilient connectors has a first connection portion defining a hole that extends over a portion of a standoff of the housing and a second connection portion that extends through a hole of a mounting structure of the pump.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

An air controller, such as for inflatable air beds, can have a pump and other components positioned inside a housing. The pump can be mounted in the housing by suspending the pump with multiple resilient connectors. These resilient connectors can reduce noise from vibration of the pump. This can be desirable in applications where noise is undesirable, such as for an air controller for an air bed.

Figure 1:
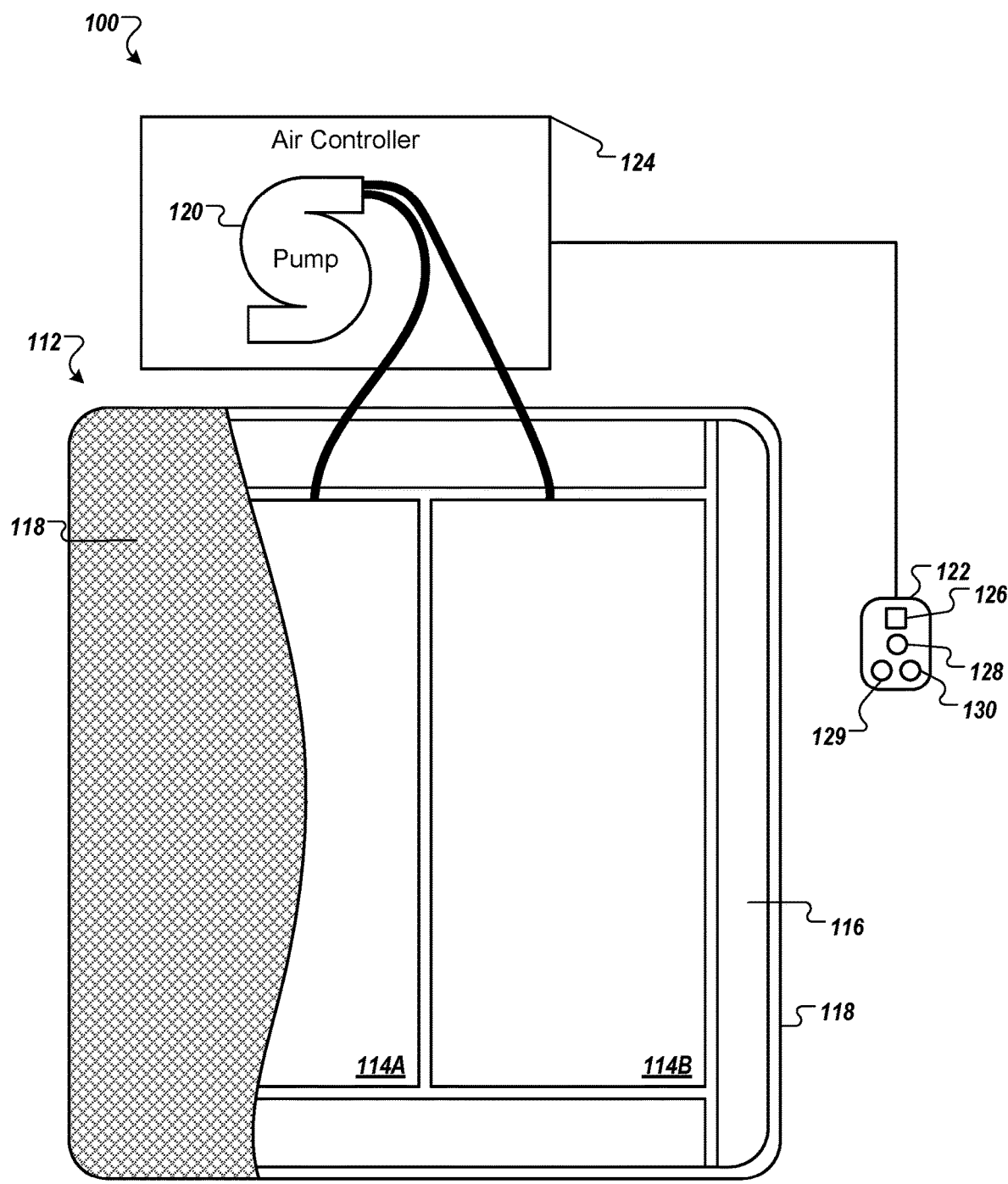
FIG. 1 shows an example air bed system.

FIG. 1 shows an example air bed system 100 that includes a bed 112. The bed 112 includes at least one air chamber 114 surrounded by a resilient border 116 and encapsulated by bed ticking 118. The resilient border 116 can comprise any suitable material, such as foam.

As illustrated in FIG. 1, the bed 112 can be a two chamber design having first and second fluid chambers, such as a first air chamber 114A and a second air chamber 114B. In alternative embodiments, the bed 112 can include chambers for use with fluids other than air that are suitable for the application. In some embodiments, such as single beds or kids' beds, the bed 112 can include a single air chamber 114A or 114B or multiple air chambers 114A and 114B. The first and second air chambers 114A and 114B can be in fluid communication with a pump 120. The pump 120 can be part of an air controller 124, which can be in electrical communication with a remote control 122. The air controller 124 can include a wired or wireless communications interface for communicating with one or more devices, including the remote control 122. The air controller 124 can be configured to operate the pump 120 to cause increases and decreases in the fluid pressure of the first and second air chambers 114A and 114B based upon commands input by a user using the remote control 122. In some implementations, the pump 120 and the air controller 124 can be integrated into a common housing. In other embodiments, the air controller 124 and the pump 120 can be in separate housings.

The remote control 122 can include a display 126, an output selecting mechanism 128, a pressure increase button 129, and a pressure decrease button 130. The output selecting mechanism 128 can allow the user to switch air flow generated by the pump 120 between the first and second air chambers 114A and 114B, thus enabling control of multiple air chambers with a single remote control 122 and a single pump 120. For example, the output selecting mechanism 128 can by a physical control (e.g., switch or button) or an input control displayed on display 126. Alternatively, separate remote control units can be provided for each air chamber and can each include the ability to control multiple air chambers. Pressure increase and decrease buttons 129 and 130 can allow a user to increase or decrease the pressure, respectively, in the air chamber selected with the output selecting mechanism 128. Adjusting the pressure within the selected air chamber can cause a corresponding adjustment to the firmness of the respective air chamber. In some embodiments, the remote control 122 can be omitted or modified as appropriate for an application. For example, in some embodiments the bed 112 can be controlled by a computer, tablet, smart phone, or other device in wired or wireless communication with the bed 112.

Figure 2:
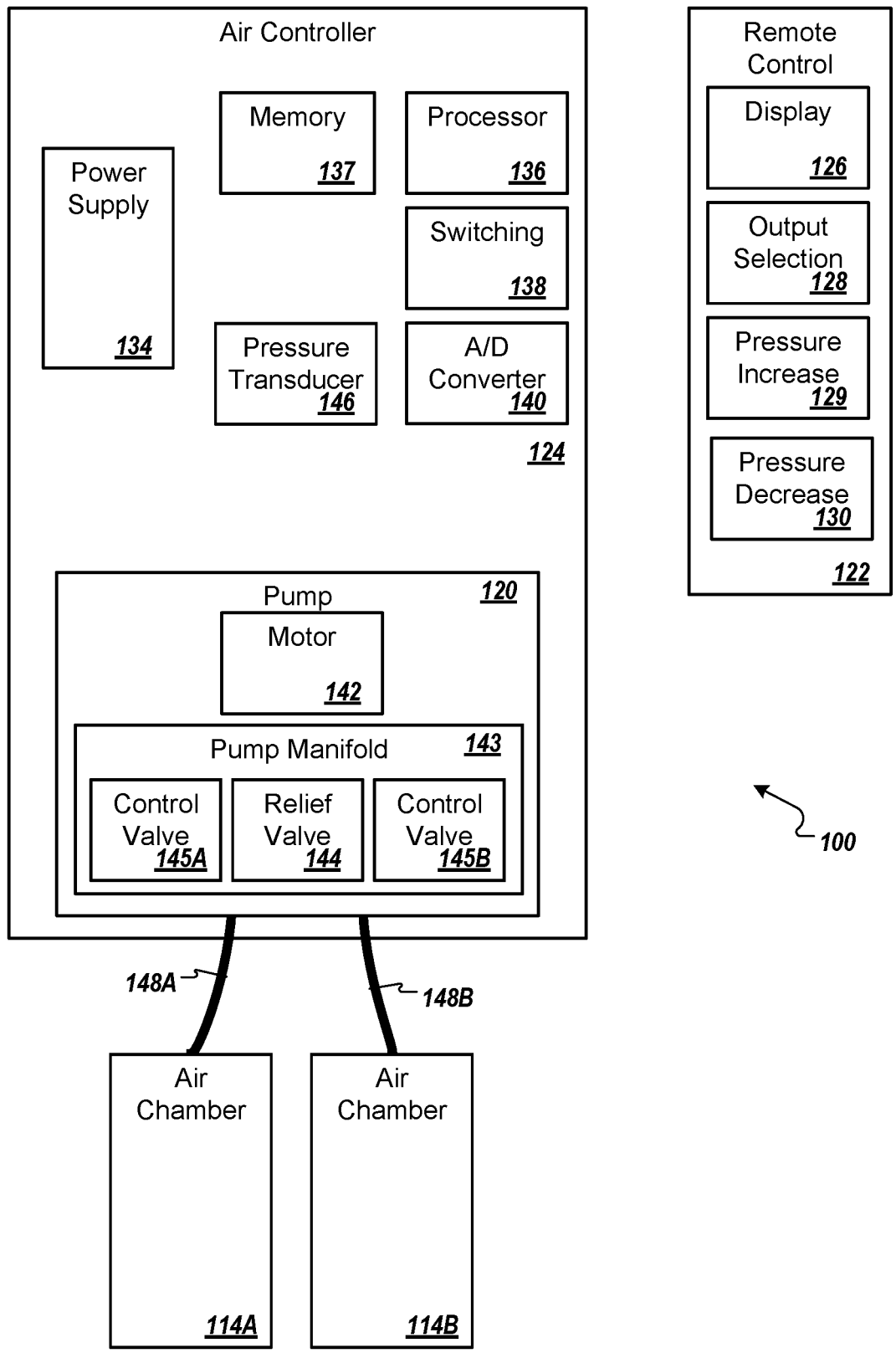
FIG. 2 is a block diagram of an example of various components of an air bed system.

FIG. 2 is a block diagram of an example of various components of an air bed system. For example, these components can be used in the example air bed system 100. As shown in FIG. 2, the air controller 124 can include the pump 120, a power supply 134, a processor 136, a memory 137, a switching mechanism 138, and an analog to digital (A/D) converter 140, a air manifold 143 (having valves 144, 145A, and 145B), and one or more pressure transducers 146. The switching mechanism 138 can be, for example, a relay or a solid state switch.

The pump 120 can include a motor 142. The pump 120 can be fluidly connected to the pump manifold, which is fluidically connected with the first air chamber 114A and the second air chamber 114B via a first tube 148A and a second tube 148B, respectively. The first and second control valves 145A and 145B can be controlled by switching mechanism 138, and are operable to regulate the flow of fluid between the pump 120 and first and second air chambers 114A and 114B, respectively.

In some implementations, the pump 120 and the air controller 124 can be provided and packaged as a single unit. In some alternative implementations, the pump 120 and the air controller 124 can be provided as physically separate units. In some implementations, the air controller 124, the pump 120, or both are integrated within or otherwise contained within a bed frame or bed support structure that supports the bed 112. In some implementations, the air controller 124, the pump 120, or both are located outside of a bed frame or bed support structure (as shown in the example in FIG. 1).

The example air bed system 100 depicted in FIG. 2 includes the two air chambers 114A and 114B and the single pump 120. However, other implementations can include an air bed system having two or more air chambers and one or more pumps incorporated into the air bed system to control the air chambers. For example, a separate pump can be associated with each air chamber of the air bed system or a pump can be associated with multiple chambers of the air bed system. Separate pumps can allow each air chamber to be inflated or deflated independently and simultaneously. Furthermore, additional pressure transducers can also be incorporated into the air bed system such that, for example, a separate pressure transducer can be associated with each air chamber.

In use, the processor 136 can, for example, send a decrease pressure command for one of the air chambers 114A or 114B, and the switching mechanism 138 can be used to convert the low voltage command signals sent by the processor 136 to higher operating voltages sufficient to operate the relief valve 144 of the pump 120 and open the control valve 145A or 145B. Opening the relief valve 144 can allow air to escape from the air chamber 114A or 114B through the respective air tube 148A or 148B. During deflation, the pressure transducer 146 can send pressure readings to the processor 136 via the A/D converter 140. The A/D converter 140 can receive analog information from pressure transducer 146 and can convert the analog information to digital information useable by the processor 136. The processor 136 can send the digital signal to the remote control 122 to update the display 126 in order to convey the pressure information to the user.

As another example, the processor 136 can send an increase pressure command. The pump motor 142 can be energized in response to the increase pressure command and send air to the designated one of the air chambers 114A or 114B through the air tube 148A or 148B via electronically operating the corresponding valve 145A or 145B. While air is being delivered to the designated air chamber 114A or 114B in order to increase the firmness of the chamber, the pressure transducer 146 can sense pressure within the air manifold 143. Again, the pressure transducer 146 can send pressure readings to the processor 136 via the A/D converter 140. The processor 136 can use the information received from the A/D converter 140 to determine the difference between the actual pressure in air chamber 114A or 114B and the desired pressure. The processor 136 can send the digital signal to the remote control 122 to update display 126 in order to convey the pressure information to the user.

Figure 3:
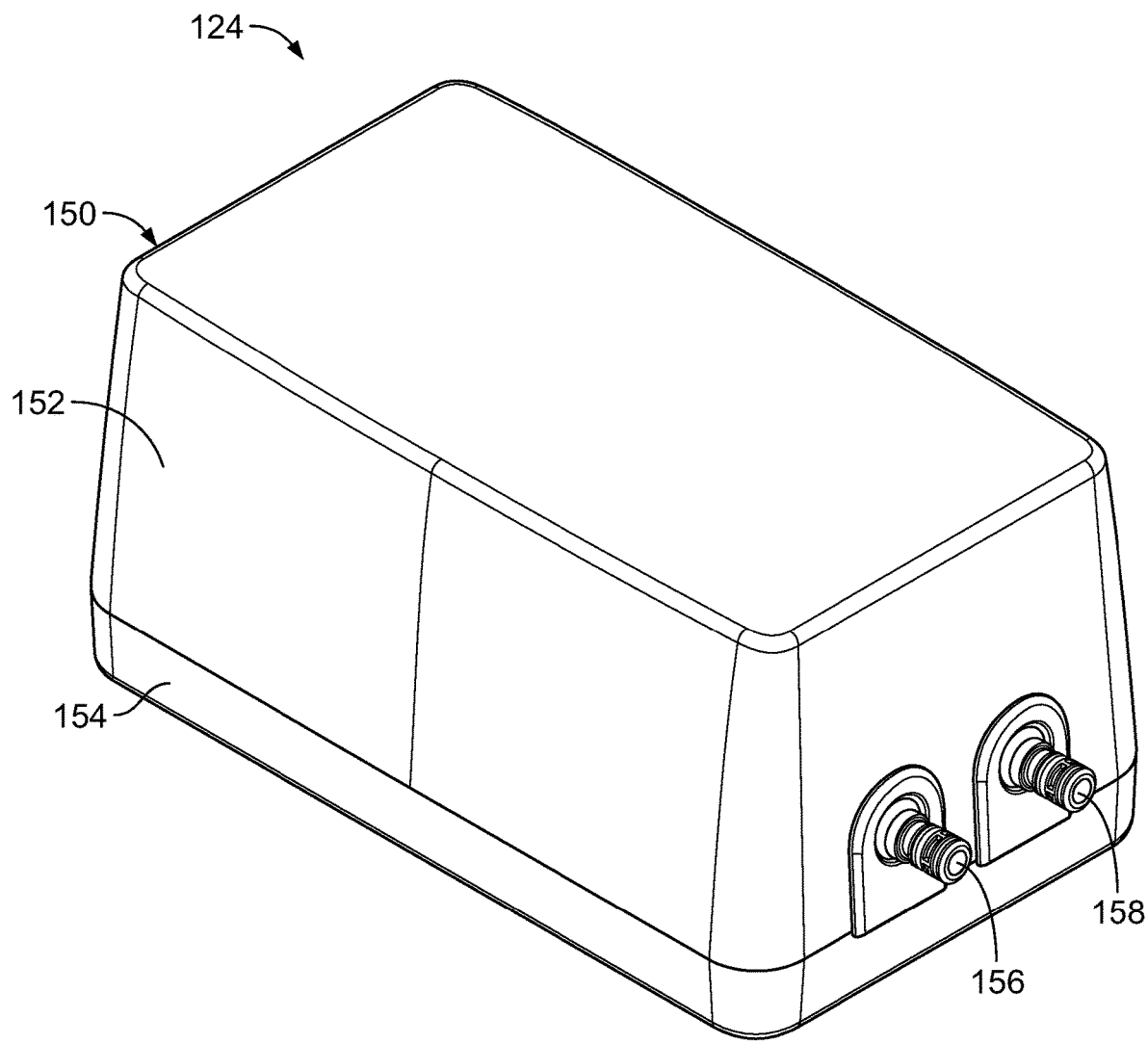
FIG. 3 is a perspective view of an air controller for use in an air bed system.

FIG. 3 is a perspective view of the air controller 124 in a housing 150. The housing 150 can include a housing top 152 and a housing bottom 154 and can substantially enclose components of the air controller 124. One or more nozzles 156 and 158 can extend through the housing 150 and can be detachably connected to the air tubes 148A and 148B (shown in FIG. 2) for inflating the air chambers 114A and 114B (shown in FIG. 2).

Figure 4A:
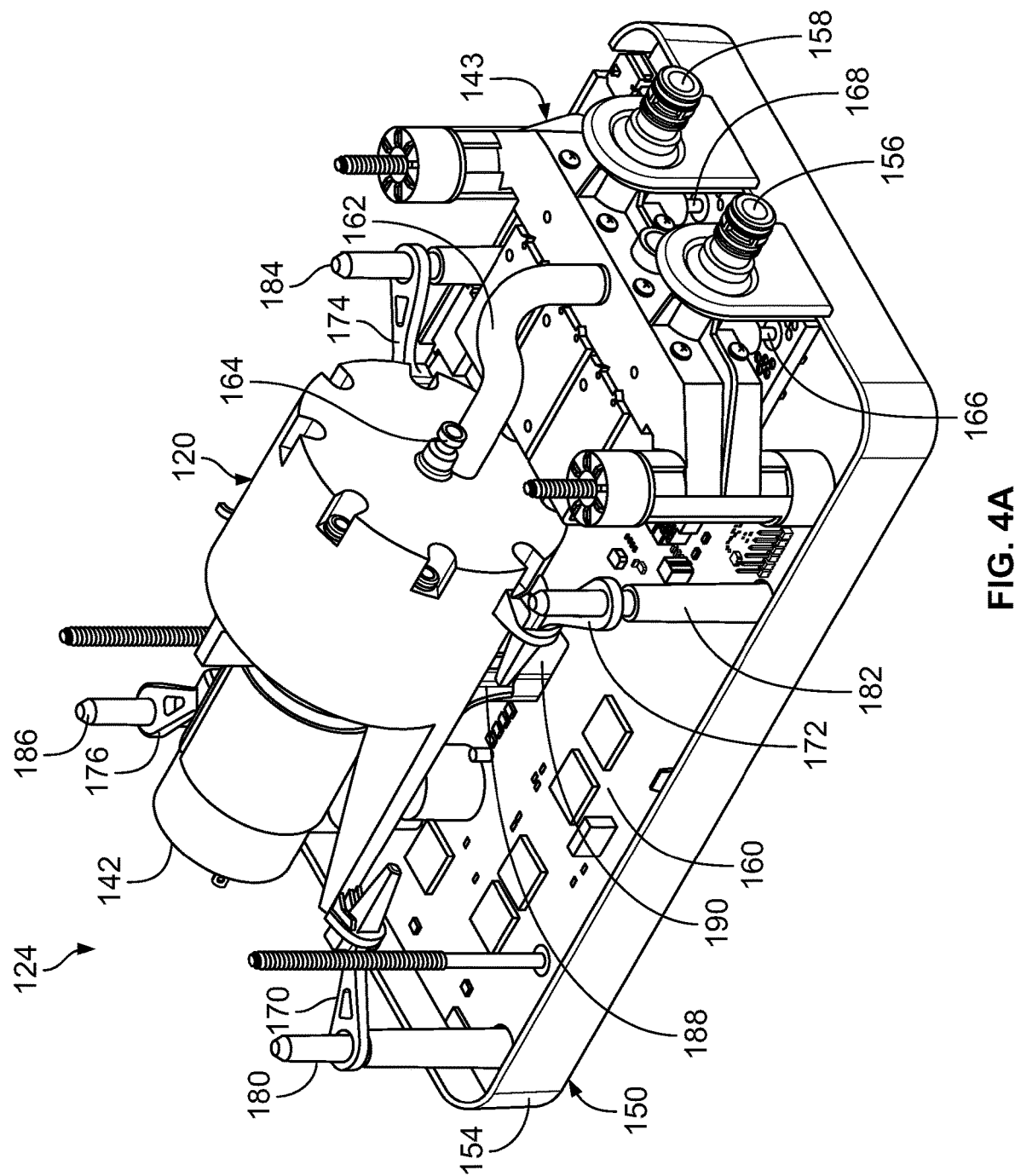
FIG. 4A is a perspective view of the air controller of FIG. 3 with a top of a housing removed.

FIG. 4A is a perspective view of the air controller 124 with the housing top 152 (shown in FIG. 3) removed so as to show internal components. As shown in FIG. 4A, the housing 150 of the air controller 124 contains the pump 120 and its motor 142, the air manifold 143, and a printed circuit board 160 (which can include some or all of the power supply 134, the processor 136, the memory 137, the switching mechanism 138, the A/D converter 140, and the pressure transducer 146 shown in FIG. 2).

A tube 162 can extend from a nozzle 164 of the pump 120 to the air manifold 143 for fluidly connecting the pump 120 to the air manifold 143. One or more additional tubes 166 and 168 can extend from the air manifold 143 to one or more pressure transducers 146 (shown in FIG. 2) on the printed circuit board 160.

A plurality of resilient connectors 170, 172, 174, and 176 connect the pump 120 to the housing 150. The resilient connectors 170, 172, 174, and 176 can extend from the pump 120 to the housing 150 in tension so as to reduce transmission of vibration from the pump 120 to the housing 150 during operation of the pump 120. The housing 150 can include mounting structures 180, 182, 184, and 186 (such as vertical posts) for connecting to the resilient connectors 170, 172, 174, and 176, respectively.

The resilient connectors 170, 172, 174, and 176 can support the pump 120 so as to be suspended in the housing 150 with the pump 120 spaced from the printed circuit board 160. This can allow the pump 120 to vibrate while partially or totally isolating the vibration of the pump 120 such that the vibration of the pump 120 has little to no effect on the printed circuit board 120 and the housing 150. This can reduce damage to the printed circuit board 150 and can reduce the amount of noise noticed by a user.

The air controller 124 can include one or more stops 188 and 190 configured for limiting movement of the pump 120 within the housing 150. The stop 188 can extend downward from the pump 120 toward the printed circuit board 160. In some embodiments, the stop 188 can be sized to contact the stop 190 when motion of the pump 120 toward the printed circuit board 160 (and/or toward other components) exceeds a threshold. In other embodiments, the stop 188 can be sized to contact another suitable structure. In some embodiments were limited contact with the printed circuit board 160 is suitable, the stop 188 can be sized to contact the printed circuit board 160 at a portion of the printed circuit board that has little or no electronic components that can be damaged as a result of being struck by the stop 188 when motion of the pump 120 toward the printed circuit board 160 exceeds a threshold.

The stop 190 can extend through a hole extending through the printed circuit board 160 toward the pump 120. The stop 190 can be sized and configured to limit movement of the pump 120 when motion of the pump 120 toward the printed circuit board 160 exceeds a threshold.

In some embodiments, the stops 188 and 190 can work in conjunction to limit movement of the pump 120. In other embodiments, movement of the pump 120 can be suitably limited by one of the stops 188 and 190 and the other can be omitted.

For example, during normal operation, the pump 120 can vibrate in a limited way such that the pump 120 is supported by the resilient connectors 170, 172, 174, and 176, without requiring the stop 188 to bump or otherwise contact the printed circuit board 160. During other conditions, such as during shipment of the air controller 124, the pump 120 can be substantially shaken such that movement of the pump 120 exceeds a threshold. In such conditions, the stop 188 can bump against a structure (such as a relatively durable portion of the printed circuit board 160 or another structure) before the pump 120 bumps against fragile components on the printed circuit board 160, such as the processor 136, the memory 137, etc.

Similarly, during normal operation, the pump 120 can vibrate in a limited way such that the pump 120 is supported by the resilient connectors 170, 172, 174, and 176, without requiring the stop 190 to bump or otherwise contact the pump 120. During other conditions, such as during shipment of the air controller 124, the pump 120 can be substantially shaken such that movement of the pump 120 exceeds a threshold. In such conditions, the stop 190 can bump against a portion of the pump 120 before the pump 120 bumps against fragile components on the printed circuit board 160, such as the processor 136, the memory 137, etc.

Figure 4B:
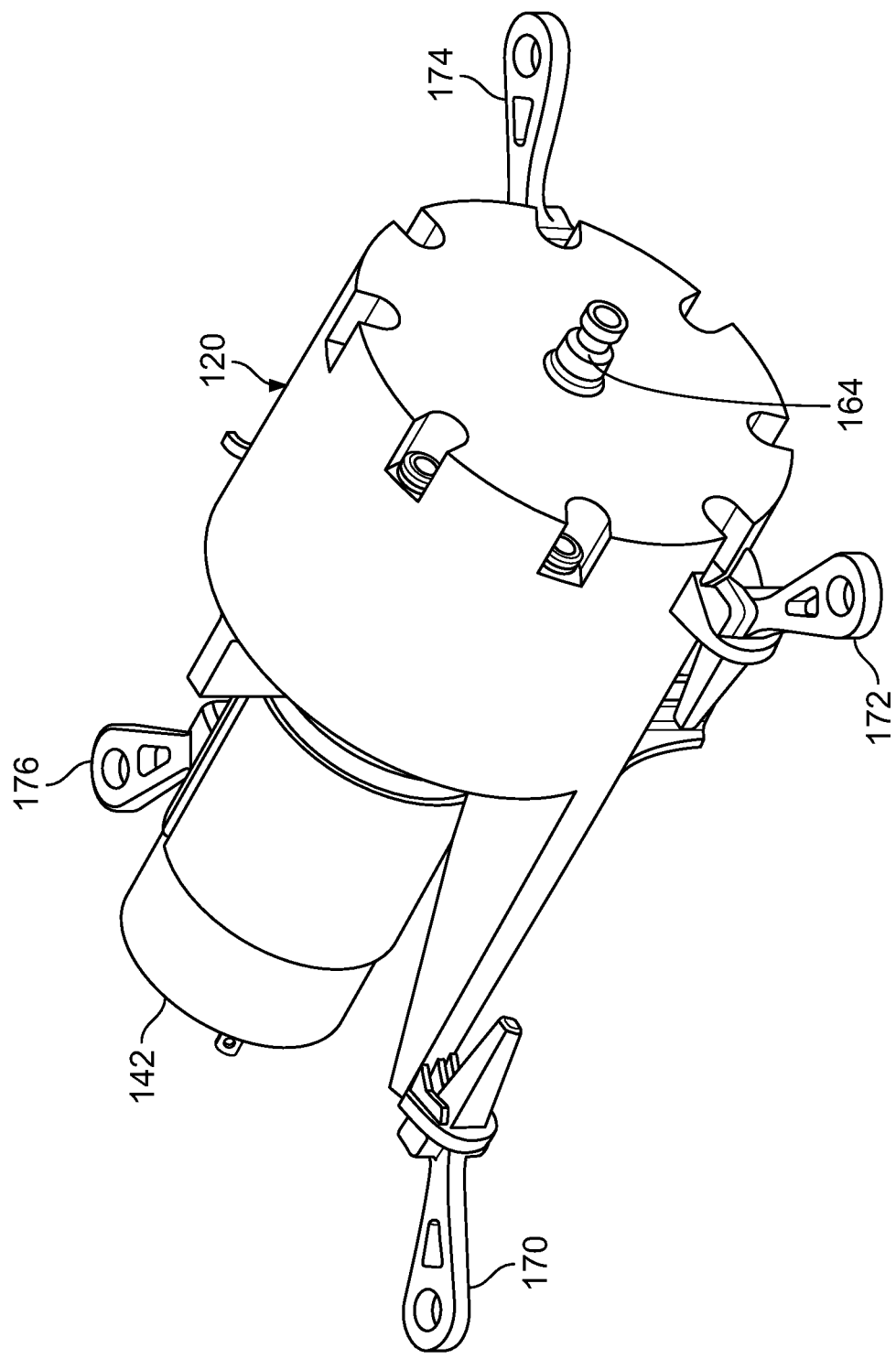
FIG. 4B is a perspective view of a pump of the air controller of FIG. 3.

FIG. 4B is a perspective view of the pump 120 and the resilient connectors 170, 172, 174, and 176, with the other features of the air controller 124 removed for clarity.

Figure 5:
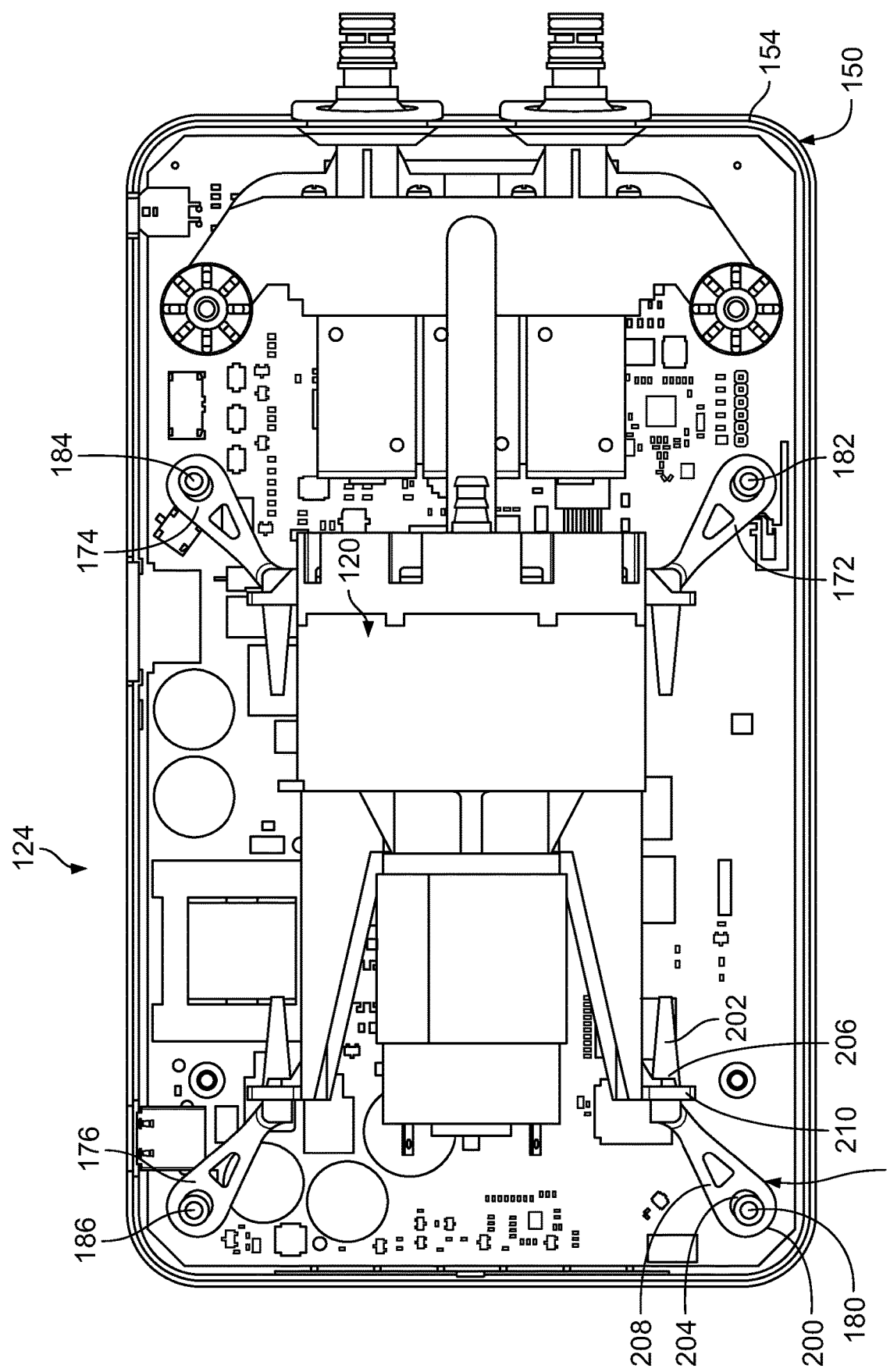
FIG. 5 is a top view of the air controller of FIG. 3 with the top of the housing removed.

FIG. 5 is a top view of the air controller 124 with the housing top 152 removed. As shown in FIG. 5, the resilient connectors 170 and 174 are connected so as to pull in tension in substantially opposite directions and the resilient connectors 172 and 176 are connected so as to pull in tension in substantially opposite directions.

Figure 6:
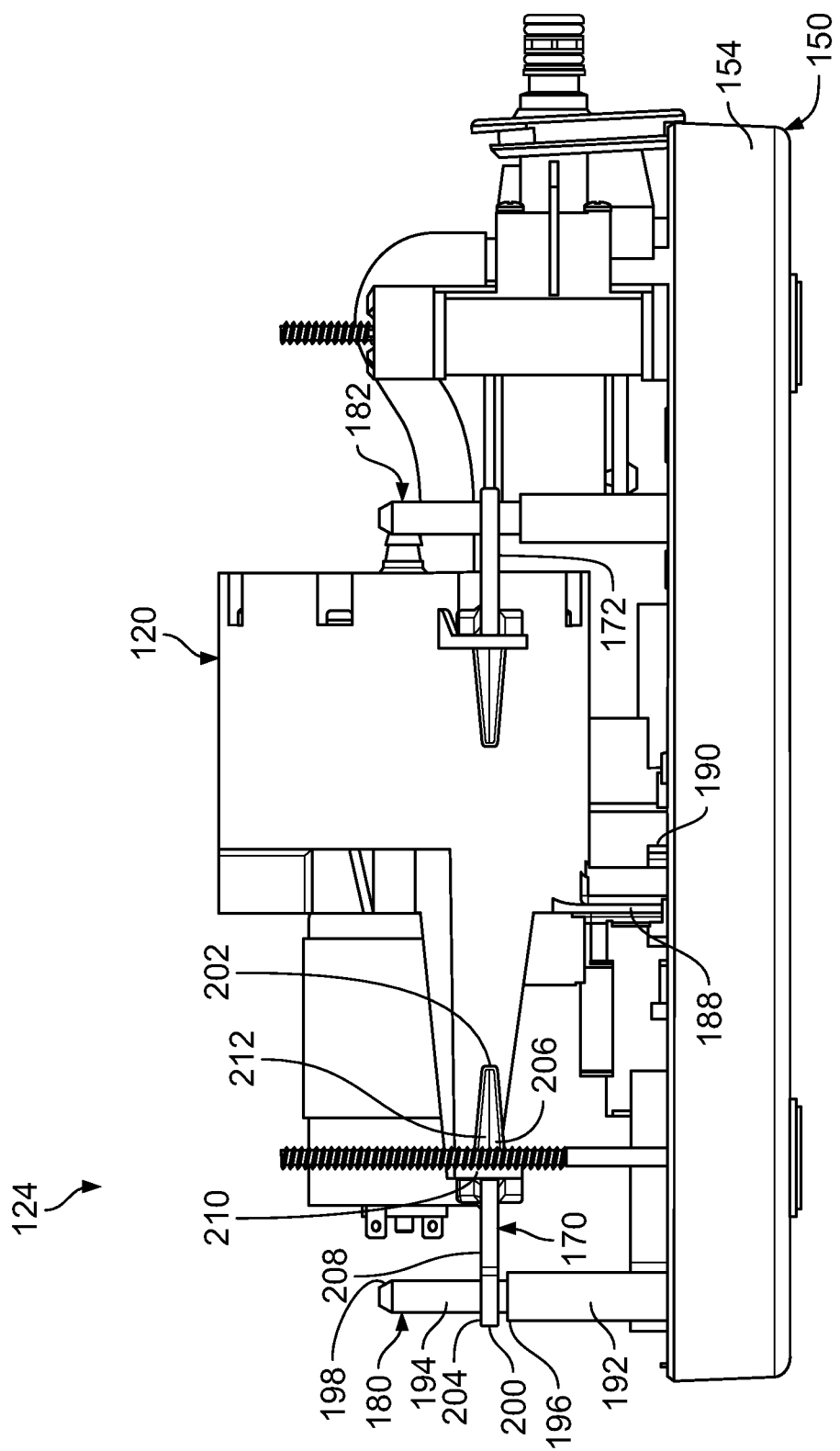
FIG. 6 is a side view of the air controller of FIG. 3 with the top of the housing removed.

FIG. 6 is a side view of the air controller 124 with the housing top 152 removed.

As shown in FIG. 6, a distal end of the stop 188 is spaced from the printed circuit board 160 (shown better in FIGS. 4A and 5) and a distal end of the stop 190 is spaced from the pump 120. This can allow the pump 120 to vibrate with slight to moderate movement without any contact from the stops 188 and 190 until movement of the pump 120 exceeds a threshold amount of movement.

FIGS. 5 and 6 show the resilient connectors 170, 172, 174, and 176 extending from the pump 120 to the mounting structures 180, 182, 184, and 186 to support and isolate the pump 120. In the illustrated embodiment, the size, shape and function of the resilient connectors 170, 172, 174, and 176 are substantially similar. Additionally, the size, shape, and function of the mounting structures 180, 182, 184, and 186 are also substantially similar in the illustrated embodiments. In other embodiments, one or more of the resilient connectors 170, 172, 174, and 176 and/or the mounting structures 180, 182, 184, and 186 can be modified as suitable for the application. For example, one or more of the resilient connectors 170, 172, 174, and 176 could be modified to be longer or shorter than as illustrated or to be connected in a different way.

As shown in FIG. 6, the mounting structures 180, 182, 184, and 186 can be substantially vertical posts that have different widths at different portions along their lengths. For example, the mounting structure 180 has a section 192 near its proximal end and a section 194 near its distal end. The section 192 can have a greater diameter than the section 194 and a shoulder 196 can be defined at the junction between the section 192 and section 194. The shoulder 196 allows the mounting structure 180 to function as a standoff to vertically support and align the resilient connector 170 when connected to the mounting structure 180. The mounting structure 180 can also have a tapered distal tip 198. During assembly, the resilient connector 170 can slide over the tapered distal tip 198 and along the section 194 to stop at or near the shoulder 196.

The resilient connector 170 can be an elongated structure with first and second ends 200 and 202. The resilient connector 170 can have a first connection portion 204 proximate the first end 200 for connecting to the mounting structure and a second connection portion 206 proximate the second end 202 for connecting to the pump 120. A resilient middle section 208 can extend between the connection portions 204 and 206 to perform dampening and isolation of vibration of the pump 120.

In the illustrated embodiment, the pump 120 includes a mounting structure 210 defining a hole for receiving the second end 202 of the resilient connector 170. The second end 202 of the resilient connector 170 can extend through the hole in the mounting structure 210 with connection portion 206 of the resilient connector 170 held fast against the mounting structure 210 of the pump 120. The resilient connector 170 can have a tapered portion 212 between the connection portion 206 and the second end 202 which can facilitate insertion of resilient connector 170 through the hole in the mounting structure 210 and resist removal of the resilient connector 170 from the mounting structure 210.

Figure 7:
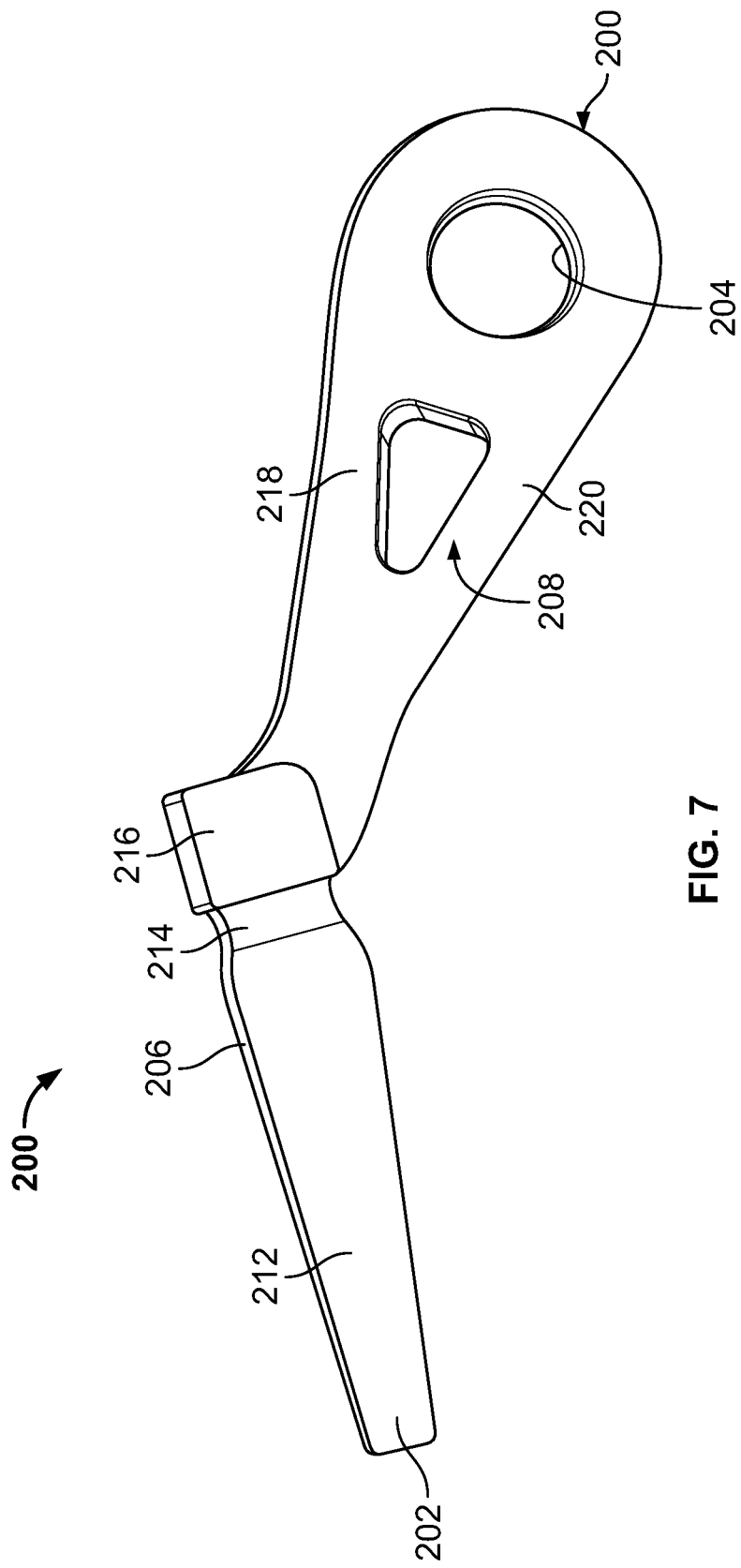
FIG. 7 is a top view of a connector.

FIG. 7 is a top view of the resilient connector 170, which further illustrates the features of the resilient connector 170. As shown in FIG. 7, the resilient connector 170 becomes thicker from the second end 202 to the connection portion 206, becomes thinner at a neck portion 214, and becomes thicker again at a pad portion 216. When assembled, the neck portion 214 can be aligned with the mounting structure 210 of the pump 120 (shown in FIGS. 5 and 6), with the connection portion 206 and the pad portion 216 positioned on opposite sides of the mounting structure 210 to hold the resilient connector 170 in place.

In some embodiments, the middle section 208 of the resilient connector 170 can be shaped and function as an elastomer band (e.g. a rubber band), defining a hole in its center between two elongated strips 218 and 220 which can elastically stretch to dampen vibration during operation of the pump 120. The resilient connector 170 can be formed from a thermoplastic vulcanizate or another elastomer suitable for the application. The elongated strips 218 and 220 can extend at an angle with respect to each-other. The elongated strips 218 and 220 can also extend angled with respect to that portion of the resilient connector extending from the second end 202 and the pad 216. The shape and configuration of the resilient connector 170 can allow the resilient connector 170 to suitably connect the mounting structure 210 to the mounting structure 180 (shown in FIGS. 4A, 5, and 6) so as to suspend the pump 120 to reduce vibration. In other embodiments, the resilient connector 170 can be modified as suitable for the application, such as if the shape or location of the mounting structures 180 and 210 were varied.

In some embodiments, the resilient connector 170 can be sized with a length between the mounting structures 180 and 210 of about an inch. In some embodiments, the resilient connector 170 can be sized with a length between the mounting structures 180 and 210 in excess of an inch. In some embodiments, the resilient connector 170 can be sized with a length between the mounting structures 180 and 210 of between 0.5 and 1.5 inches.

A number of embodiments of the invention have been described. Nevertheless, it will be understood that various modifications may be made without departing from the spirit and scope of the invention. For example, various components illustrated in the air controller 124 can be modified, such as the air manifold 143 being modified as suitable for an application with more or less than two air chambers. Additionally, the mounting structures 180, 182, 184, and 186 can be formed integrally with the housing 150 such as via injection molding or can be formed as separate components. Similarly, one or more features present on one or more of the various embodiments can be considered optional, and need not necessarily be included in all embodiments. Accordingly, other embodiments are within the scope of the following claims.

What is claimed is:

1. An apparatus comprising:
a housing defining a housing interior;
a plurality of vertical posts extending vertically and positioned in the housing interior, wherein each of the plurality of vertical posts comprise a bottom end and a top end opposite the bottom end, each of the vertical posts coupled to a bottom portion of the housing only at the bottom end;
an air pump positioned in the housing interior, wherein the air pump comprises a mounting structure defining a plurality of horizontally-oriented holes; and
a plurality of resilient connectors connecting the air pump to the vertical posts with the resilient connectors in tension so as to reduce transmission of vibration from the air pump to the housing during operation of the air pump, wherein each of the vertical posts is coupled to one of the resilient connectors, wherein one or more of the resilient connectors has a first end that defines a vertically-oriented hole positioned over one of the vertical posts and has a second end extending through one of the plurality of horizontally-oriented holes of the mounting structure of the air pump.

2. The apparatus of claim 1, wherein each of the plurality of vertical posts are further defined by a diameter, the diameter decreasing between the bottom end and the top end.

3. The apparatus of claim 1, wherein each of the plurality of vertical posts comprise a proximal portion and a distal portion, the proximal portion coupled to the bottom portion of the housing at the bottom end of each of the vertical posts, the distal portion extending from the proximal portion toward the top end of each of the vertical posts, the proximal portion defined by a proximal portion-diameter and a proximal portion-length, the distal portion defined by a distal portion-diameter and a distal portion-length, the distal portion-diameter is constant along the distal portion-length between the proximal portion and the top end.

4. The apparatus of claim 3, wherein each of the plurality of vertical posts comprise a shoulder positioned at a junction between the proximal portion and the distal portion.

5. The apparatus of claim 4, wherein the shoulder is configured to receive and support the respective resilient connector.

6. The apparatus of claim 4, wherein each of the plurality of vertical posts comprise a tapered distal tip positioned at the top end.

7. An apparatus comprising:
a housing defining a housing interior;
a plurality of vertical posts extending vertically and positioned in the housing interior, wherein each of the plurality of vertical posts comprise a bottom end and a top end opposite the bottom end, each of the vertical posts coupled to a bottom portion of the housing only at the bottom end, wherein each of the plurality of vertical posts comprise a proximal portion and a distal portion, the proximal portion coupled to the bottom portion of the housing at the bottom end of each of the vertical posts, the distal portion extending from the proximal portion toward the top end of each of the vertical posts, the proximal portion defined by a proximal portion-diameter and a proximal portion-length, the proximal portion-diameter is an outer diameter which is constant along the proximal portion-length from the bottom end of the vertical post to an opposite end of the proximal portion that is closer to the distal portion of the vertical post, the distal portion defined by a distal portion-diameter and a distal portion-length, the distal portion-diameter is an outer diameter which is constant along the distal portion-length between the proximal portion and a tapered distal tip, the proximal portion-diameter being different than the distal portion-diameter, wherein each of the plurality of vertical posts comprise a shoulder positioned at a junction between the proximal portion and the distal portion, the shoulder separating the proximal portion-diameter from the distal portion-diameter, wherein each of the plurality of vertical posts comprises the tapered distal tip positioned at the top end, wherein the tapered distal tip comprises a chamfer between an outer surface of the distal portion and a top surface of the vertical post;
an air pump positioned in the housing interior; and
a plurality of resilient connectors connecting the air pump to the vertical posts with the resilient connectors in tension so as to reduce transmission of vibration from the air pump to the housing during operation of the air pump, wherein each of the vertical posts is coupled to one of the resilient connectors.

8. The apparatus of claim 7, wherein the tapered distal tip is sized such that the respective resilient connector slides along the distal portion to stop at the shoulder.

9. The apparatus of claim 7, wherein the tapered distal tip is sized such that the respective resilient connector slides along the distal portion to stop near the shoulder.

10. The apparatus of claim 7, wherein the air pump comprises a mounting structure defining tabs, each tab defining a hole extending therethrough, each of plurality of resilient connectors comprise:
a first end portion defining a hole configured to fit about the top end of the respective vertical post; and
a second end portion coupled to the first end portion, the second end portion defining a tapered portion configured to pass through the respective tab and couple the second end portion to the respective tab.

11. The apparatus of claim 10, wherein the first end portion defines a first end portion-center axis, the second end portion defines a second end portion-center axis, and the first end portion-center axis is angled not parallel relative to the second end portion-center axis.

12. The apparatus of claim 11, wherein the first end portion-center axis intersects a center axis of the vertical post.

13. The apparatus of claim 11, wherein the second end portion-center axis is perpendicular to the respective tab.

14. The apparatus of claim 10, wherein the second end portion comprises a void extending from a top surface of the resilient connector to a bottom surface of the resilient connector.

15. The apparatus of claim 14, wherein the void is positioned between the hole and the tapered portion.

16. The apparatus of claim 14, wherein the void is triangular-shaped.

17. The apparatus of claim 16, wherein two surfaces of the triangular-shaped void are generally parallel to two outer side surfaces, respectively, of the resilient connector.

18. The apparatus of claim 16, wherein corners of the triangular-shaped void are filleted.

19. An apparatus comprising:
a housing comprising:
a housing top comprising a housing top surface and a housing top side wall extending from the housing top surface; and
a housing bottom comprising a housing bottom surface and a housing bottom side wall extending from the housing bottom surface, the housing top side wall configured to couple to the housing bottom side wall, the housing top and the housing bottom defining a housing interior;
a plurality of vertical posts positioned in the housing interior, wherein each of the vertical posts extend perpendicularly from at least one of the housing top or the housing bottom;
a pump positioned in the housing interior with a pump outlet facing a sideways direction that is parallel to at least one of the housing top or the housing bottom; and
a plurality of resilient connectors connecting the pump to the vertical posts with the resilient connectors in tension so as to reduce transmission of vibration from the pump to the housing during operation of the pump, wherein each of the resilient connectors extends parallel to at least one of the housing top surface or the housing bottom surface,
wherein each resilient connector comprises a first connection portion and a second connection portion coupled to the first connection portion, the first connection portion defining a longitudinal axis,
wherein a first pair of resilient connectors of the plurality of resilient connectors are positioned on and coupled to a first set of opposite vertical posts, the longitudinal axes of the first connection portions of the first pair of resilient connectors co-linear with an axis extending between the first set of opposite vertical posts, and
wherein a second pair of resilient connectors of the plurality of resilient connectors are positioned on and coupled to a second set of opposite vertical posts, the longitudinal axes of the first connection portions of the second pair of resilient connectors co-linear with an axis extending between the second set of opposite vertical posts.

20. The apparatus of claim 19, wherein the pump includes a plurality of tabs each configured to allow a portion of a respective one of the resilient connectors to pass through a respective one of the tabs.

21. The apparatus of claim 19, wherein each of the plurality of vertical posts comprise a tapered distal tip positioned at a top end and the tapered distal tip comprises a chamfer between an outer surface of the tapered distal tip and a top surface of the vertical post.

22. An apparatus comprising:

a housing comprising:

a housing top comprising a housing top surface and a housing top side wall extending from the housing top surface; and a housing bottom comprising a housing bottom surface and a housing bottom side wall extending from the housing bottom surface, the housing top side wall configured to couple to the housing bottom side wall, the housing top and the housing bottom combinable to enclose and define a housing interior;

a plurality of vertical posts positioned in the housing interior, wherein each of the vertical posts extend perpendicularly from at least one of the housing top or the housing bottom;

a pump positioned in the housing interior, wherein the pump includes a pump body and a pump outlet, wherein a cylindrical portion of the pump body has a center axis that is parallel to at least one of the housing top or the housing bottom; and a plurality of resilient connectors connecting the pump to the vertical posts with the resilient connectors in tension so as to reduce transmission of vibration from the pump to the housing during operation of the pump, wherein each of the resilient connectors extends parallel to at least one of the housing top surface or the housing bottom surface, wherein the cylindrical portion of the pump body includes a plurality of tabs, at least two tabs of the plurality of tabs extending horizontally in a plane, each tab of the plurality of tabs defining a respective hole that is configured to allow a portion of a respective one of the resilient connectors to pass therethrough.

* * * * *